(12) United States Patent
Fukuda et al.

(10) Patent No.: US 10,228,718 B2
(45) Date of Patent: Mar. 12, 2019

(54) OPERATION PANEL AND IMAGE FORMING APPARATUS INCLUDING THIS

(71) Applicant: KYOCERA Document Solutions Inc., Osaka (JP)

(72) Inventors: Motoyuki Fukuda, Osaka (JP); Hiroyuki Tanaka, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/557,830

(22) PCT Filed: Mar. 10, 2017

(86) PCT No.: PCT/JP2017/009723
§ 371 (c)(1),
(2) Date: Sep. 13, 2017

(87) PCT Pub. No.: WO2017/169659
PCT Pub. Date: Oct. 5, 2017

(65) Prior Publication Data
US 2018/0164848 A1     Jun. 14, 2018

(30) Foreign Application Priority Data

Mar. 28, 2016  (JP) .................................. 2016-064044

(51) Int. Cl.
*G06F 1/16*         (2006.01)
*B41J 29/13*        (2006.01)
(Continued)

(52) U.S. Cl.
CPC ............ *G06F 1/1601* (2013.01); *B41J 29/00* (2013.01); *B41J 29/13* (2013.01);
(Continued)

(58) Field of Classification Search
None
See application file for complete search history.

(56) References Cited

U.S. PATENT DOCUMENTS

2005/0024688 A1* 2/2005 Inada ................. G03G 15/5016
358/400
2005/0175371 A1* 8/2005 Kunugi ............. G03G 15/5016
399/107
(Continued)

FOREIGN PATENT DOCUMENTS

CN         104950651 A     9/2015
JP         2005-215654   * 8/2005     ............. G03G 15/00
(Continued)

OTHER PUBLICATIONS

An Office Action mailed by the State Intellectual Property Office of the People's Republic of China dated Oct. 25, 2018, which corresponds to Chinese Patent Application No. 201780001249.6 and is related to U.S. Appl. No. 15/557,830; with English translation.

*Primary Examiner* — Beniyam Menberu
(74) *Attorney, Agent, or Firm* — Studebaker & Brackett PC

(57) ABSTRACT

An operation panel (1) arranged in an image forming apparatus (10) of the present invention is provided so as to be movable between at least two side faces (14a, 14b) of a housing (14) of the image forming apparatus (10) and is arranged flush with the side face (14a, 14b).

4 Claims, 4 Drawing Sheets

(51) Int. Cl.
  *H04N 1/00*   (2006.01)
  *G06F 3/12*   (2006.01)
  *G06K 15/02*  (2006.01)
  *B41J 29/00*  (2006.01)
  *G03G 15/00*  (2006.01)

(52) U.S. Cl.
  CPC .......... *G03G 15/5016* (2013.01); *H04N 1/00* (2013.01); *H04N 1/00496* (2013.01)

(56) References Cited

U.S. PATENT DOCUMENTS

| | | | |
|---|---|---|---|
| 2006/0006298 A1* | 1/2006 | Akiyama | G03G 15/5016 248/292.12 |
| 2007/0077108 A1* | 4/2007 | Kawasaki | B41J 29/13 400/625 |
| 2010/0024589 A1* | 2/2010 | Oshima | B41J 3/46 74/577 R |
| 2012/0236340 A1* | 9/2012 | Tsuduki | H04N 1/00493 358/1.12 |
| 2012/0243042 A1* | 9/2012 | Uchida | G06F 1/1624 358/1.15 |
| 2015/0282347 A1 | 10/2015 | Maeda | |
| 2016/0266708 A1* | 9/2016 | Takehara | H04N 1/00411 |

FOREIGN PATENT DOCUMENTS

| | | | | |
|---|---|---|---|---|
| JP | 2007-163814 | * | 6/2007 | ............ G03G 15/00 |
| JP | 2009-260637 | * | 11/2009 | ............... H04N 1/00 |
| JP | 2010-039065 | * | 2/2010 | ............ G03G 15/00 |
| JP | 2010-170003 A | | 8/2010 | |
| JP | 2012-198771 A | | 10/2012 | |

* cited by examiner

__(1)__

OPERATION PANEL AND IMAGE FORMING APPARATUS INCLUDING THIS

TECHNICAL FIELD

The present invention relates to an operation panel provided in an image forming apparatus, such as a copying machine, a facsimile equipment or a multifunction peripheral, and an image forming apparatus including this.

BACKGROUND ART

Conventionally, an image forming apparatus, such as a copying machine, a facsimile equipment or a multifunction peripheral, is provided with an operation panel in order to carry out setting of various functions and others. In the operation panel, a displaying part, which consists of a liquid crystal display or the like displaying condition or the like of operation and setting of the apparatus, and a plurality of button keys, which is used for carrying out setting of various functions and others, are arranged.

In this kind of the conventional image forming apparatus, in order to meet needs, such as high or low of stature or use of a wheelchair, of various users, various techniques rotatably supporting an operation panel in a vertical direction or a horizontal direction and inclining it at a predetermined angle to improve visibility and operability for the users are proposed (as an example, refer to Patent Document 1 or Patent Document 2).

PRIOR ART DOCUMENT

Patent Document

[PATENT DOCUMENT 1] Japanese patent laid-open publication No. 2010-170003
[PATENT DOCUMENT 2] Japanese patent laid-open publication No. 2012-198771

SUMMARY OF INVENTION

Problems to be Solved by the Invention

However, in the above-mentioned conventional operation panel and the image forming apparatus including this, because the operation panel is arranged only at a front face (one side face) side of a housing, there is a problem that it is still difficult to meet various needs of the users and to sufficiently improve visibility and operability of the operation panel.

In addition, because the operation panel is arranged so as to be protruded to the front face (one side face) side of the housing, a problem that the operation panel becomes an obstacle when the image forming apparatus is conveyed or it is operated by the user, or alternatively, that an installation location of the image forming apparatus is restricted in accordance with a direction of the operation panel also occurs.

The present invention is produced in order to the above-mentioned problem and has the purpose providing an operation panel being capable of designing improvement or the like of visibility and operability of the operation panel and an image forming apparatus including this.

Means for Solving the Problem

An operation panel of the present invention is an operation panel arranged in an image forming apparatus, wherein the operation panel is provided so as to be movable between at least two side faces of a housing of the image forming apparatus and is arranged flush with the side face.

An image forming apparatus of the present invention includes the above-described operation panel.

Effects of the Invention

In accordance with the invention, it is possible to obtain various excellent effect, such as to design improvement or the like of visibility and operability of the operation panel.

DESCRIPTION OF EMBODIMENTS

Hereinafter, with reference to figures, an embodiment of the present invention will be described.

First, with reference to FIG. 1, an image forming apparatus 10 including an operation panel 1 according to embodiment of the present invention will be described. Incidentally, in the following description, directions of a far side, a near side and left and right sides are described on the basis of a direction of the image forming apparatus 10 as viewed from a front side, for convenience sake.

Figure 1:
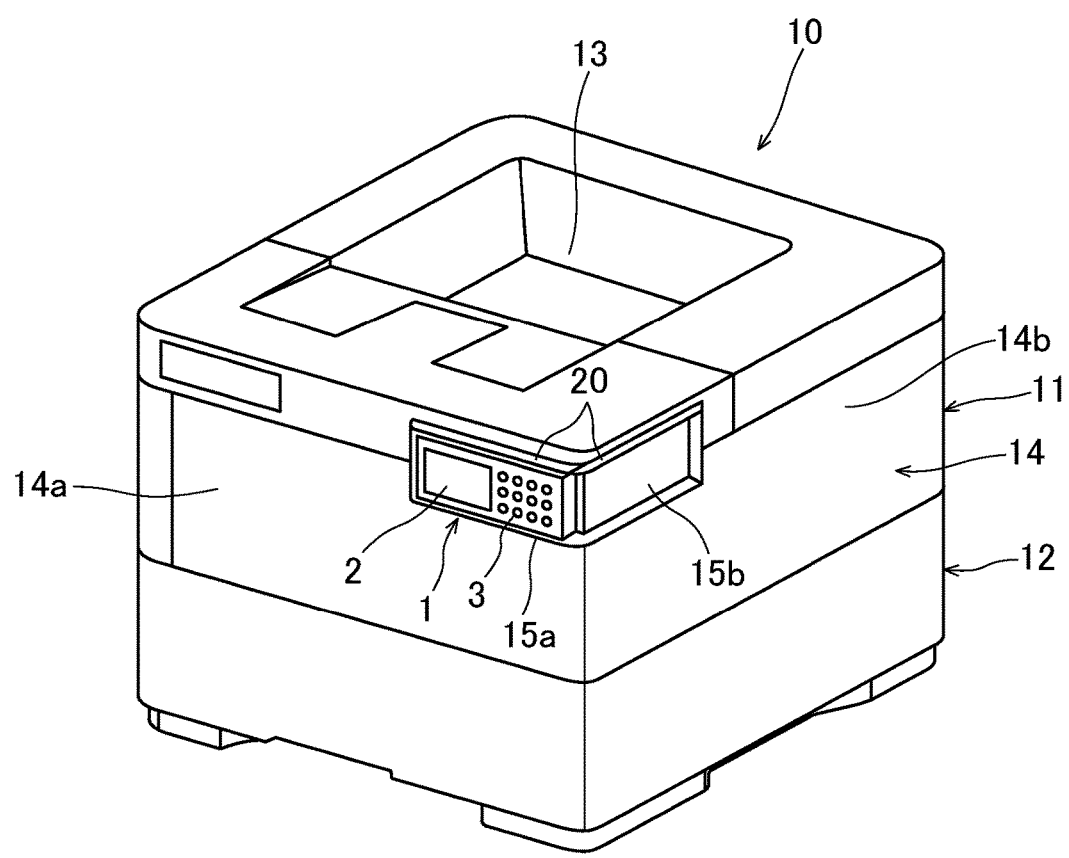
FIG. 1 It is a perspective view showing an image forming apparatus including an operation panel according to an embodiment of the present invention.

FIG. 1 is a perspective view showing the image forming apparatus 10 including the operation panel 1 according to the embodiment of the present invention and a left obliquely downward direction in FIG. 1 is a front face side of the image forming apparatus 10. The image forming apparatus 10 in this case is a printer and is configured to include an apparatus body 11 forming an image and a stacking-type sheet feeding unit 12 connected a lower side of the apparatus body 11. In an upper face side of the apparatus body 11, at a center, a sheet ejecting part 13 ejecting a sheet conveyed from the sheet feeding unit 12 to the apparatus body 11 and printed is arranged. Incidentally, although FIG. 1 illustrates only one stage of the sheet feeding unit 12, multiple stages of the sheet feeding units 12 may be arranged below the apparatus body 11.

At the right side of an upper part of a front face 14a of a housing 14 of the apparatus body 11, a front face side storing recessed part 15a in a horizontal elongated rectangular shape is formed. At the near side of an upper part of a right face 14b of the housing 14 of the apparatus body 11, a right face side storing recessed part 15b in a horizontal elongated rectangular shape is formed. The front face side storing recessed part 15a and the right face side storing recessed part 15b continue via a right corner part at the near side of the apparatus body 11.

In the front face side storing recessed part 15a, the operation panel 1 can be stored so as to become flush with the front face 14a of the housing 14. In the right face side storing recessed part 15b, the operation panel 1 can be stored so as to become flush with the right face 14b of the housing 14.

The operation panel 1 has a horizontal elongated rectangular shape and is electrically connected to the apparatus body 11 by a cable or a connecter, or alternatively, by wireless. At a surface side of the operation panel 1, a displaying part 2, which consists of a liquid crystal display or the like displaying condition or the like of operation and setting of the apparatus body 11, and a plurality of button keys 3, which is used for carrying out setting of various functions and others, are arranged. The operation panel 1 is provided so as to be movable between the front face side storing recessed part 15a and the right face side storing recessed part 15b by a moving mechanism 20.

Next, with reference to mainly FIG. 2A, FIG. 2B and FIG. 2C, the moving mechanism 20 of the operation panel 1 according to the embodiment of the present invention will be described.

Figure 2A:
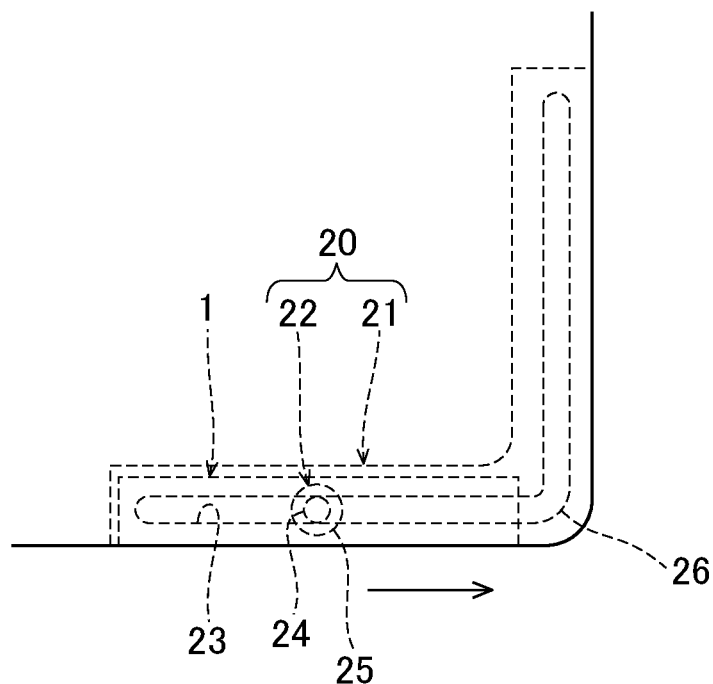
FIG. 2A It is a plan view showing a moving mechanism of the operation panel, in a state that the operation panel is located at a front face side of a housing, according to the embodiment of the present invention.
Figure 2B:
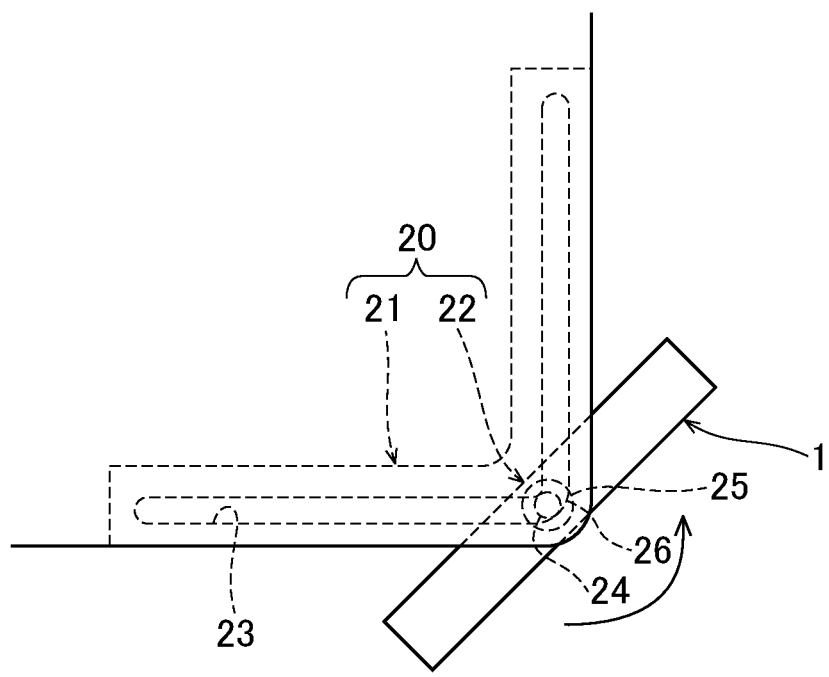
FIG. 2B It is a plan view showing the moving mechanism of the operation panel, when the operation panel is moving at a corner part of the housing, according to the embodiment of the present invention.
Figure 2C:
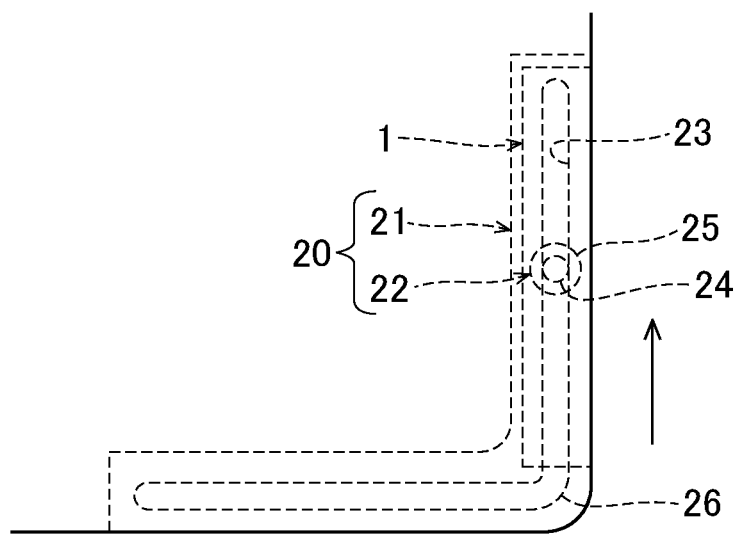
FIG. 2C It is a plan view showing the moving mechanism of the operation panel, in a state that the operation panel is located at a right face side of the housing, according to the embodiment of the present invention.

FIG. 2A, FIG. 2B and FIG. 2C are plan views showing the moving mechanism 20 of the operation panel 1. Particularly, FIG. 2A shows a state that the operation panel 1 is located at the front face 14a's side of the housing 14. FIG. 2B shows a state when the operation panel 1 is moving at a corner part of the housing 14. FIG. 2C shows a state that the operation panel 1 is located at the right face 14b's side of the housing 14.

The moving mechanism 20 of the operation panel 1 is composed of a rail part 21 arranged in upper sides of the front face side storing recessed part 15a (refer to FIG. 1) and the right face side storing recessed part 15b (refer to FIG. 1) and an engaging part 22 of the operation panel 1 configured so as to be engageable with the rail part 21.

In the rail part 21, over between the upper side of the front face side storing recessed part 15a (refer to FIG. 1) and the upper side of the right face side storing recessed part 15b (refer to FIG. 1), a slit groove 23 is formed by being bent in an L-shape in a planar view.

The engaging part 22 is protruded in an upward vertical direction in a center part of an upper face of the operation panel 1. The engaging part 22 is configured to include a columnar shaft part 24 penetrating through the slit groove 23 upwardly/downwardly and a disk-formed stopper part 25 formed in an upper end of the shaft part 24 and having a larger diameter than an outer diameter of the shaft part 24 and a width of the slit groove 23.

By the moving mechanism 20 including such a configuration, in a case moving the operation panel 1 in a state being stored in the front face side storing recessed part 15a (refer to FIG. 1) as shown in FIG. 2A to the right face side storing recessed part 15b (refer to FIG. 1), first, the engaging part 22 of the operation panel 1 is slid to the right side (an arrow direction in FIG. 2A) along the slit groove 23 of the rail part 21.

Subsequently, as shown in FIG. 2B, when the engaging part 22 of the operation panel 1 is moved to a bent part 26 of the slit groove 23 of the rail part 21, the operation panel 1 is turned by 90 degrees in a counterclockwise direction (an arrow direction in FIG. 2B) around the engaging part 22.

After that, as shown in FIG. 2C, the engaging part 22 of the operation panel 1 is slid to the far side (an arrow direction in FIG. 2C) along the slit groove 23 of the rail part 21, and then, the operation panel 1 is stored in the right face side storing recessed part 15b (refer to FIG. 1).

Incidentally, to the contrary, a case where the operation panel 1 is moved from the right face side storing recessed part 15b (refer to FIG. 1) the front face side storing recessed part 15a (refer to FIG. 1) can be carried out in an opposite direction to and in a similar manner to those described above.

As described above, in accordance with the operation panel 1 according to the embodiment of the present invention and the image forming apparatus 10 including this, while meeting needs of various users, e.g. a case where the user stood in the front side of the image forming apparatus 10 placed on a desk operates or a case where the user on a wheelchair operates from the right side of the image forming apparatus 10, it is possible to move the operation panel 1 according to desire between two side faces of the housing 14, such as the front face 14a and the right face 14b. Therefore, it is possible to remarkably improve visibility and operability for the users.

In addition, since the operation panel 1 is arranged flush with the front face 14a or the right face 14b of the housing 14, there is no trouble that the operation panel 1 becomes an obstacle when the image forming apparatus 10 is conveyed or it is operated by the user, or alternatively, that an installation location of the image forming apparatus 10 is restricted in accordance with a direction of the operation panel 1. Therefore, it is possible to improve convenience of the image forming apparatus 10 and it is possible to design compactification of the image forming apparatus 10 and minimization of the installation location.

Incidentally, although the above-described embodiment was described about a case where, by sliding the operation panel 1 with the moving mechanism 20, the operation panel 1 is provided movable between two side faces of the housing 14, such as the front face 14a and the right face 14b, the present invention is not restricted by the above-described embodiment.

That is, the moving mechanism 20 may be provided with rail parts 21 at both upper and lower sides. Alternatively, the moving mechanism 20 may be movable by providing the operation panel 1 being attachable and detachable with respect to the two side faces 14a and 14b of the housing 14. For example, concave and convex parts may formed in the housing 14 and the operation panel 1 so that the operation panel 1 can be engaged with and detached from the side faces 14a and 14b of the housing 14, or magnets may be provided so that the operation panel 1 and the housing 14 are attracted with each other.

Further, by attaching turning and holding mechanism (not shown) between the housing 14 and the operation panel 1, the operation panel 1 may be provided turnable around an upper end as a fulcrum upwardly/downwardly and holdable at any inclined angle. By applying such a configuration, it is possible to further improve visibility and operability for the users.

Moreover, although the above-described embodiment was described about a case where the present invention is applied to the printer, the present invention may be applied to the image forming apparatus in another type, such as a copying machine, a facsimile or a multifunction peripheral.

Figure 3:
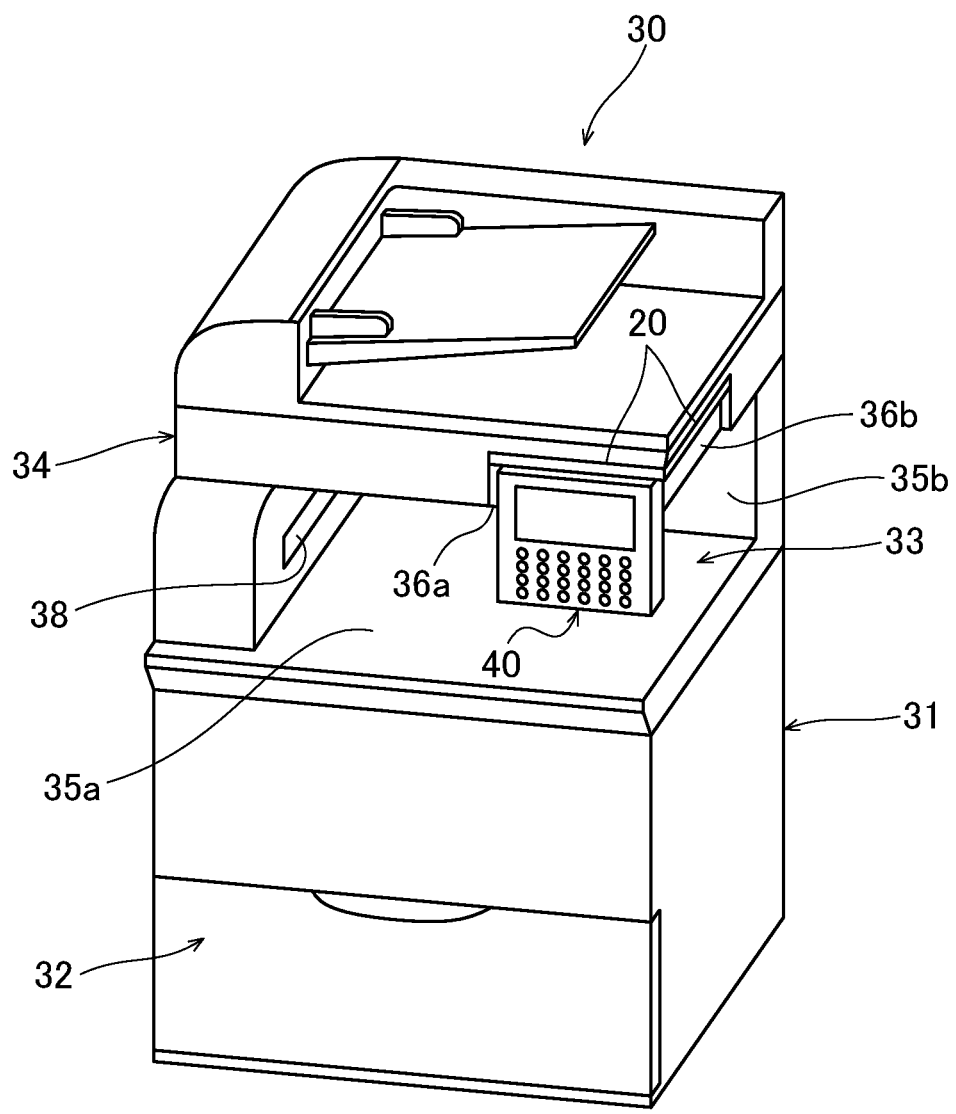
FIG. 3 It is a perspective view showing the image forming apparatus including the operation panel according to another embodiment of the present invention.

For example, the present invention may be applied, as shown in FIG. 3, an image forming apparatus 30 in an apparatus model of an in-body paper ejection type. In this case, the image forming apparatus 30 includes an apparatus body 31 forming an image, a sheet feeding cartridge 32 provided in a lower part of the apparatus body 31 and a document reading device 34 arranged above the apparatus body 31 via a sheet ejection space 33. In the two side faces being adjacent to each other surrounding the sheet ejection space 33, opening parts 35*a* and 35*b* are formed at a front face side and a right face side, respectively. Subsequently, an operation panel 40 is provided movable between a front face side storing recessed part 36*a* and a right face side storing recessed part 36*b* by the moving mechanism 20 so as to close a part of these opening parts 35*a* and 35*b*.

In this case, in addition to an effect being capable of improving visibility and operability for the users, by moving the operation panel 40 to a position being a windscreen of an exhaust air from a fixing device (not shown) discharged from the inside of the apparatus body 31 to the sheet ejection space 33 via a sheet ejecting port 38, it is also possible to prevent an unpleasant feeling from giving to the user of the image forming apparatus 30.

Incidentally, because the above-description of the embodiments of the present invention illustrates suitable embodiments of the operation panel 1 according to the invention and the image forming apparatuses 10 and 30 including this, there are some cases indicating various technically preferable definition in structure, shape and others, but the technical scope of the invention is not limited to these aspects, unless it is described so that the invention is particularly limited.

The invention claimed is:

1. An operation panel arranged in an image forming apparatus, wherein
the operation panel is provided so as to be movable between two side faces of a housing of the image forming apparatus and a surface of the operation panel is arranged flush with the side face where the operation panel is moved,
the operation panel is provided so as to be slid between storing recessed parts formed continuously in the two side faces being adjacent to each other of the housing and the surface of the operation panel becomes flush with the side face in a state being stored in the storing recessed part where the operation panel is slid.

2. The operation panel according to claim 1,
wherein an apparatus model of the image forming apparatus is an in-body paper ejection type in which opening parts are formed in the two side faces being adjacent to each other of the housing,
the operation panel is provided so as to close a part of the opening parts.

3. The operation panel according to claim 1,
wherein the operation panel is provided so as to be turnable around an upper end as a fulcrum upwardly/downwardly and to be holdable at any inclined angle.

4. An image forming apparatus comprising:
an operation panel,
wherein the operation panel is provided so as to be movable between two side faces of a housing of the image forming apparatus and a surface of the operation panel is arranged flush with the side face where the operation panel is moved,
the operation panel is provided so as to be slid between storing recessed parts formed continuously in the two side faces being adjacent to each other of the housing and the surface of the operation panel becomes flush with the side face in a state being stored in the storing recessed part where the operation panel is slid.

* * * * *